United States Patent [19]

Gillett et al.

[11] Patent Number: 4,752,441
[45] Date of Patent: Jun. 21, 1988

[54] MODULAR FORMER FOR INNER BARREL ASSEMBLY OF PRESSURIZED WATER REACTOR

[75] Inventors: James E. Gillett, Greensburg; Douglas E. Ekeroth, Plum Boro, both of Pa.

[73] Assignee: Westinghouse Electric Corp., Pittsburgh, Pa.

[21] Appl. No.: 798,195

[22] Filed: Nov. 14, 1985

[51] Int. Cl.$^4$ .............................................. G21C 5/10
[52] U.S. Cl. .................................................. 376/399
[58] Field of Search ............... 376/175, 352, 377, 389, 376/399

[56] References Cited

U.S. PATENT DOCUMENTS

| | | | |
|---|---|---|---|
| 3,356,589 | 12/1967 | Grell et al. | 376/399 |
| 3,720,581 | 3/1973 | Kaser . | |
| 3,823,066 | 7/1974 | Thome . | |
| 4,199,403 | 4/1980 | Puri et al. . | |
| 4,410,487 | 10/1983 | Tautz et al. | 376/399 |

FOREIGN PATENT DOCUMENTS

| | | | |
|---|---|---|---|
| 125326 | 11/1984 | European Pat. Off. | 376/399 |
| 104645 | 2/1971 | Fed. Rep. of Germany . | |
| 818886 | 4/1978 | Fed. Rep. of Germany . | |
| 424060 | 11/1965 | France . | |
| 134250 | 12/1972 | France . | |
| 115492 | 5/1968 | United Kingdom . | |

OTHER PUBLICATIONS

European Search Report, The Hague, 23-02-1987, Examiner Kavcic.

Primary Examiner—Deborah L. Kyle
Assistant Examiner—Richard L. Klein
Attorney, Agent, or Firm—D. C. Abeles

[57] ABSTRACT

An array of plural rod guides each housing therewithin corresponding pluralities of rods, as disposed in parallel axial relationship within the cylindrical sidewall of the inner barrel assembly of a pressurized water reactor, defines a plurality of peripheral regions between the inner circumferential surface of the cylindrical sidewall and the peripheral edges of the array. A plurality of modular formers is installed within the respective plurality of peripheral regions, at each of one or more banks of predetermined, respective elevations within the inner barrel assembly. Each modular former comprises a pair of parallel former plates having arcuate outer edges corresponding to the interior circumference of the cylindrical sidewall and chordlike inner edges contoured to correspond to the juxtaposed peripheral edge of the array, and a vertical column extending between and rigidly interconnecting the associated plates of a pair. Attachment means secured to the surfaces of the plates extend beyond the respective outer arcuate edges thereof and through holes provided therefore in the cylindrical sidewall and are welded thereto from the exterior surface of the sidewall. One more banks of modular formers, as required, establish the proper pressure drop of the core output flow from the lower barrel assembly so as to approach an axial flow condition within the inner barrel assembly, reducing turbulance and minimizing vibration in operation.

25 Claims, 5 Drawing Sheets

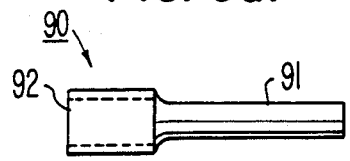
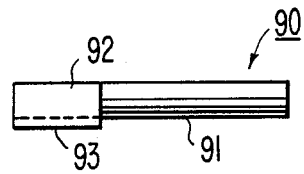
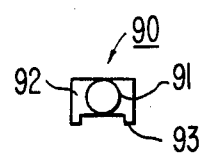
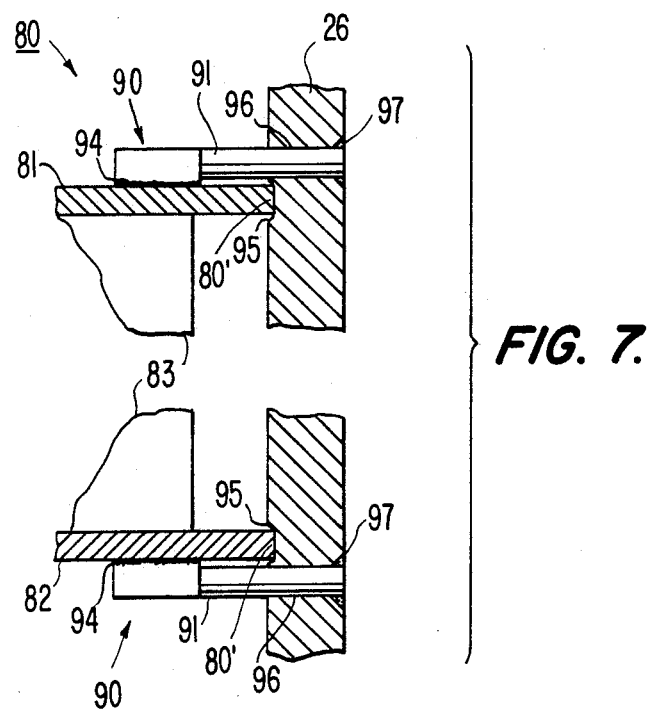

MODULAR FORMER FOR INNER BARREL ASSEMBLY OF PRESSURIZED WATER REACTOR

BACKGROUND OF THE INVENTION

1. Field of the Invention

This invention relates to pressurized water reactors and, more particularly, to a modular former for use in the inner barrel assembly of such reactors.

2. State of the Prior Art

Baffle type structures have been known for use in the portion of a reactor which surrounds the reactor core, usually termed the lower barrel assembly. Such baffle structures typically are comprised of plates which are bolted together to form a unitary baffle structure. Since not positioned in the core outlet flow, such known baffle structures are not subjected to the same type of thermal transients and flow loads as can exist within the inner barrel assembly of a reactor, and particularly a reactor of the advanced design to which the present invention primarily is directed. Specifically, in a reactor of the type with which the modular former of the present invention is employed, the reactor internals of the inner barrel assembly includes several hundred rods, or rodlets, which are selectively movable in an axial, vertically oriented direction, into and out of the lower barrel assembly, to control the activity of the reactor core. The rodlets thus are positioned directly in the core outlet flow, rendering it critical to maintain substantially uniform distribution of the outlet flow from the reactor core in an axial direction as the flow passes along the rodlets and through the upper barrel assembly. The core outlet flow, moreover, at least potentially presents significant thermal stresses due to the core outlet flow transients and induces vibrations. Since these conditions and corresponding flow control requirements do not exist in conventional reactors, no corresponding structures are known in the prior art for performing the functions of the modular formers of the present invention.

SUMMARY OF THE INVENTION

A pressurized water nuclear reactor of the type with which the modular formers of the present invention are intended for use employs a large number of reactor control rods or rodlets, typically arranged in what are termed reactor control clusters (RCC) and, additionally, a large number of water displacer rods, or rodlets, similarly arranged in water displacer rodlet clusters (WDRC). For example, in one such reactor, an array of 185 such clusters containing a total of 2800 rodlets (i.e., the total of reactor control rods and water displacer rods) are mounted in parallel axial relationship within the inner barrel assembly. Each of these clusters moreover is received within a corresponding rod guide structure. In operation, it is desired to maintain the core outlet flow in an axial flow condition and in a substantially uniform distribution throughout the cross-section of the inner barrel assembly, as it passes through the inner barrel assembly, and thus prevents cross-flow conditions (i.e., core flow in a direction transverse of the rod guides). This is a critical requirement in reactors of such advanced designs in which the inner barrel is densely loaded with rodlets, as before noted.

The geometry of the reactor vessel itself introduces a structural anomaly which is contrary to maintaining the desired, substantially uniform axial flow condition. Particularly, the circular configuration of the reactor vessel, including the inner barrel assembly, is geometrically incompatible with the generally rectangular or square cross-sectional configuration of the individual rod guides, and of an array thereof as stacked in closely adjacent relationship within the inner barrel. Thus, in the peripheral regions between the inside diameter of the cylindrical inner barrel assembly and the outer periphery of the array of rod guides, no rodlets are present, resulting in a nonuniform flow distribution and presenting at least the potential of turbulence and cross-flow conditions with attendant problems of vibration.

The modular formers of the present invention thus are configured to be received and rigidly supported in these peripheral regions, to provide hydraulic resistance and thereby to maintain a primarily axial direction, and substantially uniform distribution, of the core outlet flow throughout the length of the rod guides within the inner barrel assembly. The formers thus are directly exposed to the core outlet flow and are potentially subjected to flow induced vibrations and significant thermal stresses due to core outlet flow transients. To accommodate these stringent operating and environmental conditions, the formers are of a modular configuration, each including upper and lower, horizontally and radially inwardly extending former plates interconnected by vertically (i.e., axially) extending corrugated columns which are welded at their opposite ends to the respective upper and lower former plates. In a specific embodiment herein disclosed, the modular formers are of two different configurations, respectively corresponding to the two different spacings, or shapes, of the peripheral regions, each extending for only a limited arcuate segment of the circumferential distance about the inside diameter of the inner barrel assembly. In the disclosed design, eight such modules, four of each of the two types, are disposed in a common horizontal rank, and three such ranks are disposed in vertically displaced positions, or elevations, within the inner barrel, thereby to obtain the proper pressure drop for assuring that the axial flow and uniform distribution conditions in the rod guide region are achieved.

Each module is fabricated by welding so as to form a unitary structure prior to being mounted within the upper barrel assembly. Cantilever attachment elements are welded, in advance, onto the remote surfaces of the upper and lower former plates and include parallel-extending shanks. The shanks are inserted through corresponding holes provided therefore in the sidewall of the inner barrel, and then welded to the sidewall from the exterior of the inner barrel sidewall.

The structural configuration and assembly of the modules, including the mounting of the cantilever attachment means thereon, readily adapts same to efficient, automated production, permitting complete assembly of the modules in advance of positioning same within the inner barrel; as well, installation of the modules can be performed quickly and easily, in view of the capability of the exterior welding of the cantilever attachment elements to the sidewall of the inner barrel. The welded, unitary construction of each modular former and the welded attachment to the inner barrel sidewall furthermore eliminates the use of bolts, such as are employed in prior art core baffle structures and the problem of maintaining preloads on such bolts, which problem is far more severe in the core outlet flow environment which exists within the inner barrel than the environment which exists within the region of the core itself.

These and other objects and advantages of the modular formers for the inner barrel assembly of a pressurized water reactor in accordance with the invention will be more apparent from the following detailed description of the invention and the accompanying drawings.

BRIEF DESCRIPTION OF THE DRAWINGS

FIGS. 6(a), 6(b) and 6(c) comprise plan, side elevational and end elevational views, respectively, of the cantilever attachment element used for mounting the modular formers to the inner barrel; and FIG. 7 comprises an elevational view, partly in cross-section and taken along the line 7—7 in FIG. 2, illustrating the attachment of upper and lower former plates of a modular former to the sidewall of the inner barrel.

DETAILED DESCRIPTION OF THE INVENTION

Figure 1:
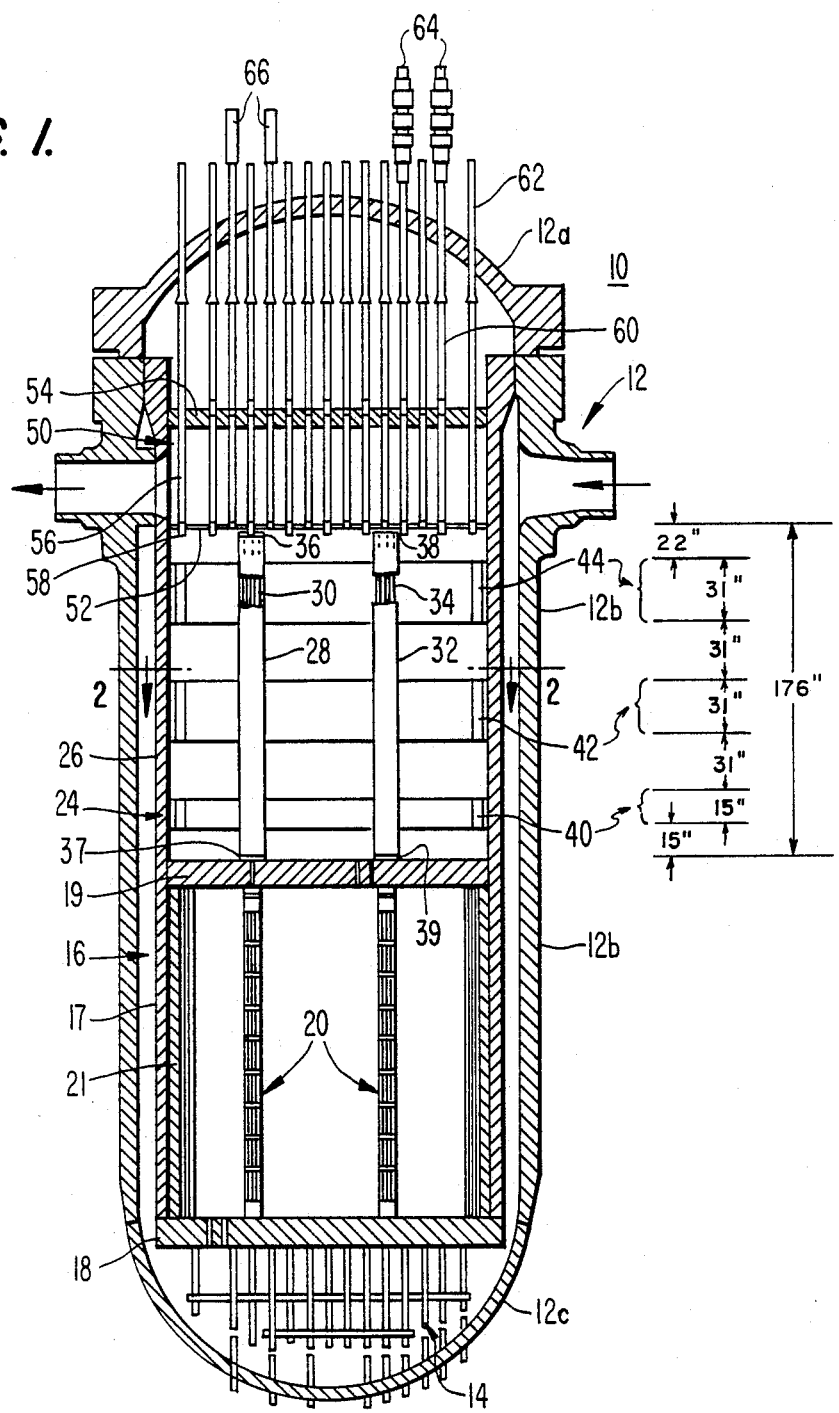
FIG. 1 is an elevational view, partly in cross-section and partly broken away, of a pressurized water reactor of an advanced design as herein contemplated, incorporating modular formers in accordance with the invention.

FIG. 1 is an elevational view, partly in cross-section, of an advanced design pressurized water reactor 10 of the type with which the modular formers of the present invention are intended to be employed, and which comprises a vessel 12 of generally conventional configuration including an upper dome 12a, cylindrical sidewalls 12b, and a bottom closure 12c comprising the base of the reactor 10. Within the bottom closure 12c, there is schematically indicated so-called bottom-mounted instrumentation 14. The lower barrel assembly 16 comprises a generally cylindrical sidewall 17 affixed at its lower and upper ends to respective lower and upper core plates 18 and 19. Fuel rod assemblies 20 are positioned in generally vertically oriented, parallel axial relationship within the lower barrel assembly 16. A radiation reflection shield 21 is mounted interiorly of the cylindrical sidewalls 17, in conventional fashion.

The inner barrel assembly 24 includes a cylindrical sidewall 26 within which are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 33 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19. The upper mounting means 36 and 38 mount the respective rod guides 28 and 32 to a calandria assembly 50, and which may be of the types disclosed in the concurrently filed applications entitled TOP END SUPPORT FOR WDRC ROD GUIDES OF PRESSURIZED WATER REACTOR and FLEXIBLE ROD GUIDE SUPPORT STRUCTURE FOR INNER BARREL ASSEMBLY OF PRESSURIZED WATER REACTOR, each having a common co-inventor herewith and assigned to the common assignee hereof. Three banks of modular formers 40, 42 and 44, in accordance with the present invention, spaced at successively higher elevations within the inner barrel assembly 24 and affixed to the interior surface of the cylindrical sidewall 26 thereof, are provided to establish the proper pressure drop of the core outlet flow from the lower barrel assembly 16, as it passes upwardly through the inner barrel assembly 24, so as to approach an axial flow condition in the region of the rod guides 28 and 30 in a manner and for reasons to be more fully described hereinafter.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54 and to which the calandria tubes 56 are mounted at their respective, opposite ends. Calandria extensions 58 project downwardly from at least selected ones of the calandria tubes 56 and connect to corresponding ones of the mounting means 36 and 38 for the upper ends of the tube guides 28 and 32, as specifically illustrated in FIG. 1 for the upper mounting means 36 associated with the RCC rod guide 28.

Extending upwardly beyond the upper calandria plate 54 and particularly within the dome 12a of the vessel 12, there are provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. Control rod cluster (RCC) displacement mechanisms 64 and water displacement rod cluster (WDRC) displacement mechanisms 66 are associated with the respective head extensions 62, flow shrouds 60 and calandria tubes 56 which, in turn, are respectively associated with the respective clusters of radiation control rods 30 and water displacment rods 34. Particularly, the RCC and WDRC displacement mechanisms 64 and 66 connect through corresponding lines to the respective clusters of radiation control rods and water displacement rods 30 and 34, to control the position thereof and, particularly, to selectively lower same through corresponding openings provided therefore in the upper core plate 19 into surrounding relationship with respectively associated fuel rod assemblies 20. While the particular control function is not relevant to the present invention, insofar as the control over the reaction within the core is effected by the selective positions of the respective rod clusters 30 and 34, it is believed that those skilled in the art will appreciate that moderation or control of the reaction is accomplished in accordance with the extent to which the control rod cluster 30 is inserted into the core and with the effective water displacement adjustment which is achieved by movement of the water displacement rods 34.

Figure 2:
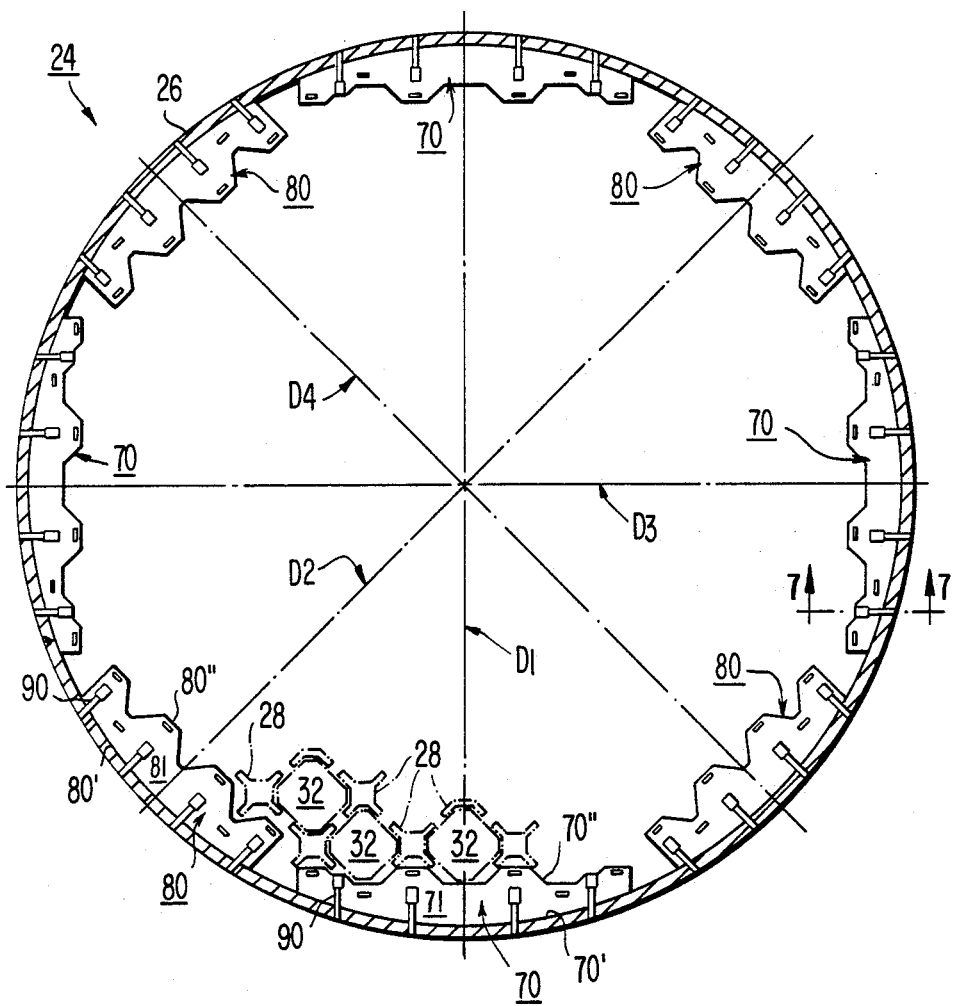
FIG. 2 is a cross-sectional view taken along the line 2—2 in FIG. 1, illustrating the mounting of a bank of modular formers of an alternating succession of first and second types to the inner barrel, and the relative relationship thereto of the rod guides.

The general configuration and arrangement of the modular formers, in each of the lower, mid, and higher banks of modular formers 40, 42 and 44, is substantially identical, the principal differences being the vertical height of each thereof in the different banks and, as later detailed, the relative radial depth and effective arcuate segment encompassed thereby within a given bank. Thus, with concurrent reference to FIGS. 1 and 2, the latter being a cross-sectional view taken along the line 2—2 in FIG. 1, the plan view of the bank 42 of modular formers is illustrative as well of a plan view of the banks 44 and 40. Moreover, as will become clear, the modular formers of each bank 42 are identical in configuration and assembly as to the upper and lower surfaces thereof, and thus FIG. 2 illustrates a plan view from the lower surface of each of the banks, 40, 42 and 44 as well.

As before noted, only a single RCC tube guide 28 and single WDRC tube guide 32 are shown in FIG. 1, it having been noted that a large number thereof are disposed in closely adjacent relationship in an array extending substantially throughout the entire cross-sectional area of the inner barrel assembly 24. In FIG. 2, several WDRC rod guides 32 are shown along with interspersed RCC rod guides 28, the guides 28 and 32 having a complementary configuration permitting an interdigitized and alternating geometric pattern thereof, somewhat of a honeycomb in nature, which occupies substantially the entire cross-sectional area within the cylindrical sidewall 26 of the inner barrel assembly 24. Due to the generally square, cross-sectional configuration of the WDRC rod guides 32, and the generally X-shaped cross-sectional configuration of the RCC rod guides 28, the array of alternating, or staggered RCC and WDRC rod guides 28 and 32 has a generally rectangular perimeter. This necessarily results in arcuate segment spacings in the peripheral regions between the generally rectangular perimeter edges of the array of rod guides 28 and 32 and the circular interior circumference of the cylindrical sidewall 26. Moreover, the peripheral regions differ in configuration and size. Particularly, for the square, cross-sectional configuration of the WDRC rod guides 32, a different spatial relationship and configuration is defined between the rod guides 32 of a lowermost row as seen in FIG. 2 having the respective diagonals thereof extending in parallel with a diameter D1 and the adjacent interior circumferential surface of the sidewall 26, compared to that configuration and size of the peripheral region lying between a row of rod guides 32 having a pair of sidewalls which are parallel to the 45° displaced diameter D2. Accordingly, the modular former 70 disposed symmetrically about the diameter D1 has a different configuration than that of the modular former 80 disposed symmetrically about the diameter D2.

It will be apparent, of course, that for other cross-sectional configurations of the guides 32 (e.g., rectangular or other polyhedron structure), that other geometrical relationships would exist, defining differing peripheral regions between the boundaries of the array and the interior circumference of the cylindrical sidewall 26. Since interchangeability, modularity, and uniform array characteristics are usually desired, the rod guides 32 typically will have a cross-sectional structure which is symmetrical about one or more axes (e.g., an equal number of sides respectively disposed in paired, parallel relationship). The resulting array perimeter defines a corresponding, repeating succession of peripheral regions of differing configurations. The modular formers accordingly are shaped to correspond to these differing configurations. Thus, for the array of FIG. 2, there are two different configurations of modular formers 70 and 80, which repeat in alternating succession at 45° angular segments. Specifically, modular formers 70 of the first type are disposed symmetrically about the diameters D1 and D3, and modular formers 80 of the second type are disposed symmetrically about the respective 45°-related diameters D2 and D4, in succession.

Figure 3:
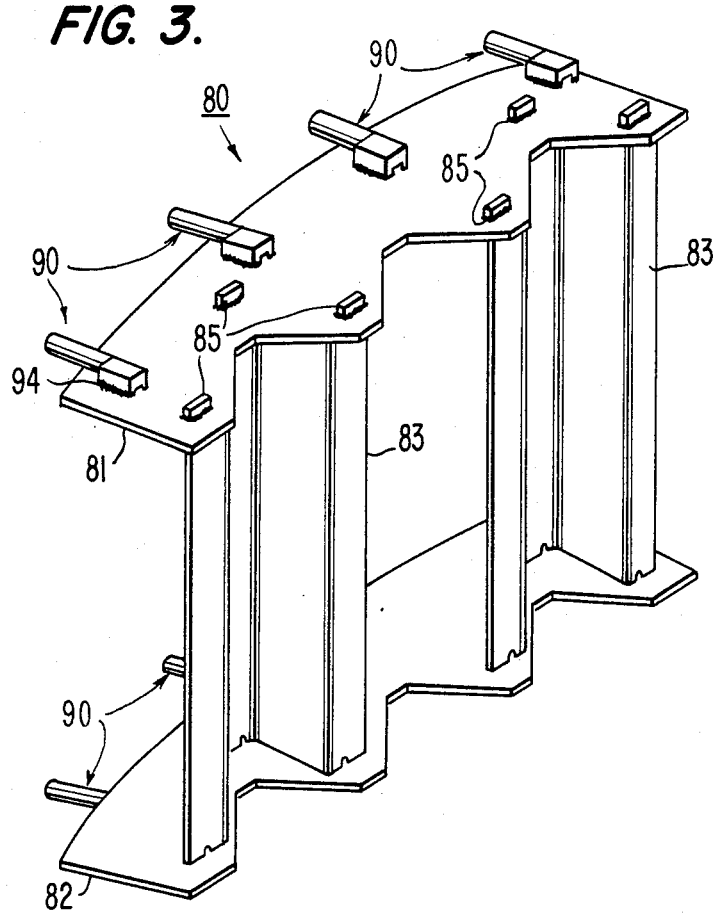
FIG. 3 is a perspective view of a typical modular former of a second type, or configuration, and of which a plurality are employed in each of the banks of modules as illustrated in FIG. 2.
Figure 4A:
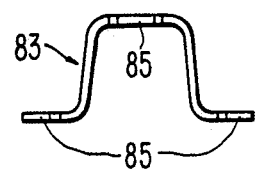
FIGS. 4(a) and 4(b) comprise end and side elevational views, respectively, of the vertical, deep U-shaped column associated with a modular former of the second type as seen in FIG. 3, FIG. 4(b) further illustrating details of the mating configuration of the U-shaped vertical column with the associated former plates.
Figure 4B:
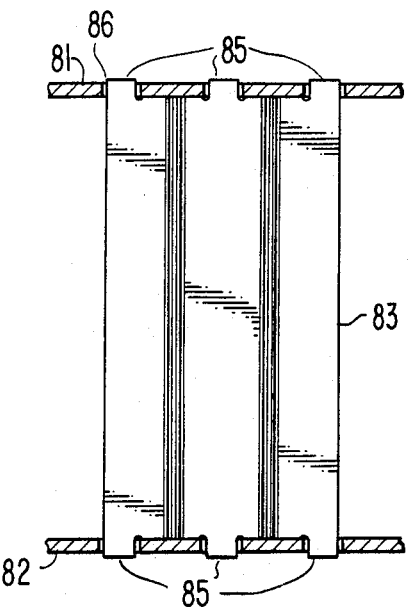

FIG. 3 is a perspective view of a typical modular former 80 of the second type, but serves as well to illustrate the basic construction of the modular formers 70 of the first type. The modular former 80 includes an upper former plate 81 and a lower former plate 82, which are identical in configuration, and first and second vertical columns 83 which likewise are identical in configuration, having generally U-shaped cross-sections. With concurrent reference to FIGS. 3, 4(a) and (4b), each of the U-shaped vertical columns 83 includes tabs 85 extending from the respectively opposite ends thereof, and which are received through corresponding slots 86 in the respective upper and lower former plates 81 and 82. A weld bead 87 is formed on the remote exterior surfaces of the respective former plates 81 and 82 at their junctures with the tabs 85, as seen in FIG. 3.

Figure 5A:
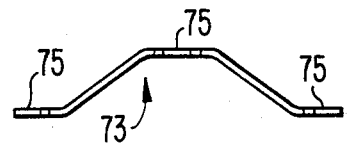
FIGS. 5(a) and 5b) comprise end and side elevational views, respectively, of the vertical, spread (or shallow) U-shaped column associated with the modular former of the first type, FIG. 5(b) further illustrating details of the mating configuration of the spread U-shaped vertical column with the associated former plates.
Figure 5B:
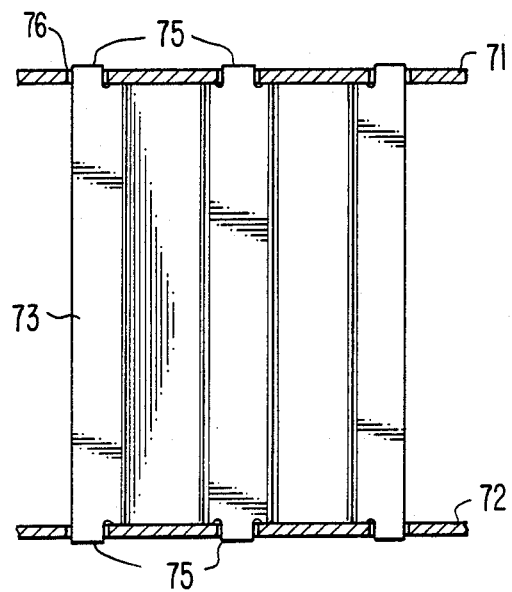

As before noted, the first type of modular former 70 has the same basic construction as the second type of modular former 80, but is configured differently in accordance with the different peripheral region in which it is employed, generally being more shallow. This can readily be appreciated by comparing FIG. 5(a), comprising an end elevational view of a vertical column 73 as employed in the first type of modular former 70, with the end elevational view in FIG. 4(a) of the vertical column 83 of the second type of modular former 80. The vertical column 73 includes corresponding tabs 75 by which it is mounted through slots 76 to its corresponding upper and lower former plates 71 and 72, as illustrated in FIG. 5(b).

Whereas each of the identical former plates 71, 72 and the identical former plates 81, 82 has an identical radius of curvature of its outer arcuate segment edge 70', 80', the respectively corresponding inner, chordlike edges 70'', 80'' are provided with mating contours for accommodating the elements of the array respectively adjacent thereto. Thus, the modular formers 70 of the first type have relatively larger arcuate segment edges 70' and correspondingly, longer inner chordlike edges 70'', with relative shallower contours for defining a mating relationship with the diagonally protruding corners of the juxtaposed, or adjacent rod guides 32, the latter being separated further by the rod guides 28 which are interposed therebetween. Conversely, the former plates of the second type of modular former 80 have relatively shorter outer arcuate segment edges 80' and inner chordlike edges 80''; and the latter are more deeply notched or contoured to accommodate the more closely spaced and more sharply outwardly protruding portions of the rod guides 28. Thus, the respective, inner chordlike edges 70'' and 80'' have contours which mate with the effective contours of the peripheral edges of the array of guides 28 and 32 juxtaposed therewith. It likewise will be appreciated that the interposed, or alternating, relationship of the guides 28 and 32 and the nature of the alignment thereof within the array will define the contours of the peripheral edges of the array and correspondingly the mating dimensions and contours of the inner chordlike edges of the former plates. Thus, the inner edges 70" are relatively longer in view of the parallel relationship thereof to the alignment axis of the diagonally oriented guides 32 having the guides 28 interspersed therebetween; conversely, the inner edge 80" is parallel to an alignment axis of the guides 32 which is parallel to a pair of parallel edges of the rod guides 32. As is also apparent, the shallower depth of the U-shaped vertical channels 73 relative to the greater depth of the channels 83 corresponds to the mating contours of the inner edges 70" and 80" of the respectively associated modular formers 70 and 80.

Each of the modular formers 70 and 80 is secured to the cylindrical sidewall 26 by cantilever attachment elements 90, which are shown in more detail in FIG. 6(a), 6(b) and 6(c), respectively comprising plan, side elevational and end elevational view thereof. The cantilever attachment element 90 preferably is integrally formed to include a shank portion 91 and a mounting block 92 in common axial alignment, the block 92 being undercut on its lower surface to define a pair of legs 93. With reference to FIG. 3, weld lines 94 are formed between the legs 93 and the corresponding surface of the former plate 81. The significance of the legs 93 is that full penetration weld lines 94 readily may be provided, optimizing the weld attachment. The elements 90 are correspondingly attached to the lower former plate 82.

FIG. 7 is an elevational, partially cross-sectional view taken along the line 7—7 in FIG. 2 and illustrates the attachment of a modular former 80 to the cylindrical sidewall 26 through use of the cantilever attachment elements 90. The sidewall 26 preferably includes annular grooves 95 positioned at the desired height of the former plates 81 and 83 for a given bank of modular formers 40, 42 and 44, within which the respective outer, arcuate edges 80' of the former plates 81 and 82, respectively, are received. Further, holes 96 are formed through the sidewalls 26 through which the shanks 91 of the cantilever attachment elements 90 are received and which then are welded in place from the exterior of the sidewall 26, as illustated by weld lines 97.

With reference to FIG. 2, it will be appreciated that the holes 96 provided in the sidewall 26 for the cantilever attachment elements 90 of a given former extend in parallel relationship relative to the associated, symmetrically related diameter. Moreover, the cantilever attachment elements 90 are secured to the respective former plates 71 and 81 as seen in FIG. 2 so as to dispose the mounting blocks 92 at a common radius less than that of the sidewall 26 such that the outer extremities of the shanks 91 are substantially flush with the outer surface of the sidewall 26. FIG. 2 shows the elements 90 attached to the upper former plates 71 and 81 and affixed to the sidewall 26. It will be understood that the elements 90 attached to the corresponding, lower former plates 72 and 82 (not seen in FIG. 2) are correspondingly affixed to the sidewall 26. The modular formers 70 and 80 of the invention, assembled and installed as the three banks 40, 42 and 44 shown in FIG. 1, thus provide a succession of six former plates at corresponding, six displaced vertical elevations within the inner barrel assembly 24.

The modular construction of the formers is of great significance, both structurally and as to their functional performance during subsequent operation of the reactor 10.

Specifically, the entirety of each of the modules 70 and 80 may be assembled externally of the inner barrel 26, including welding of the cantilever attachment elements 90 thereto. Because of the parallel axial relationship of the cantilever attachment elements 90, and the corresponding holes 96 provided therefore in the sidewall 26, each of the modules 70 and 80 readily may be inserted into position and then welded to the sidewall 26 from the exterior of the latter, greatly facilitating the assembly operation. The vertical columns within each module afford substantial strength and rigidity to the former plates which they join. By way of example, individual former plates, if mounted individually (or as a continuous annular ring) in a cantilever type mount arrangement, would not have nearly the stability or rigidity as is achieved through the modular construction of the formers of the present invention. Any such continuous, annular former, moreover, would be incapable of being fully assembled prior to insertion into the barrel, and specifically, could not permit the exterior welding operation by which the modular formers of the invention may be attached to the barrel.

During operation, the modular formers 70 and 80 provide the required pressure drop to cause the core outlet flow to approach an axial flow condition with uniform distribution in the rod guide region within the inner barrel assembly 24. The structural configuration of each module, comprising the vertical columns joined by welding to the former plates, affords a very stiff, i.e., rigid, yet relatively lightweight structure; this is highly important, so as to reduce the potential of flow-induced vibration and seismic loading on the inner barrel assembly 24. The use of modules, moreover, as distinguished for example from a continuous former plate extending throughout the inner circumference of the sidewall 26, inherently reduces thermal stresses which otherwise could be encountered between such a unitary former plate and the sidewall 26. Moreover, because of the modular construction, the attachment points for a given module are relatively closely spaced and, thus, the amount of elastic deformation required to relieve stress due to differential thermal reaction of the former plate and the sidewall 26 is reduced. Additionally, the circular cross-section of the shank porton 91 of each cantilever attachment element 90 is capable of deflection, thereby permitting differential thermal expansion between the former plate and the sidewall 26 without introducing overstressing. The welded assembly of each module is significant, since both the column attachment welds and the module attachment welds are placed in sheer, such that a complete and clean sheer across the entire section of the weld must occur before separation of the mating parts could occur.

By way of illustration and exemplification but not limitation, a specific system having three banks of modular formers in accordance with the invention is now described with reference to the particular structural dimensions. In one specific design, the cylindrical sidewall 26 of the inner barrel assembly 24 has a diameter of approximately 169 inches and an axial height of approximately 176 inches between the upper core plate 19 and the lower calandria plate 52. The upper and lower former plates 81, 82 and 71, 72 are formed of steel of approximately one inch thickness and the associated vertical columns 73 and 83 are formed of steel sheet of approximately one-half inch thickness. The U-shaped columns 73 are approximately four inches in the depth of the relatively shallow U-shaped portion. The deeper U-shaped channels 83 are of a width of approximately 16 inches with a depth of the U-shaped portion of approximately 6.5 inches. The height of the vertical columns 73 and 83 is approximately 15 inches for the bottom bank 40 and approximately 31 inches for the upper banks 42 and 44. The lower bank 40 is displaced approximately 15 inches from the upper core plate 19 and a vertical spacing of approximately 31 inches is provided between each of the respective banks 40 and 42 and banks 42 and 44. While the foregoing is illustrative of a specific implementation, it is to be understood that other sizes of formers, elevational spacings thereof, and the like, may be dictated by the particular configuration of, and fluid dynamics within a given reactor. It also will be appreciated that while a preferred configuration of the modular formers has been disclosed, the particular contouring thereof and the like will be dependent upon the character of the rod guides and the assemblage thereof into an array. Further, whereas the preferred form of a modular former includes two parallel columns such as 73, 73 and 83, 83 for the respective modules 70 and 80, other configurations may dictate modification of the specifically illustrated, preferred modular formers; illustratively, and with reference to FIG. 3, a unitary column 83 may be suitable in certain applications and by contrast multiple columns 83 may be more appropriate in other applications. In any such variations, it is important that the column provide both rigid vertical separation and radially displaced multipoint connections with the parallel former plates, so as to afford lateral stability and rigidity.

Accordingly, it is believed apparent to those of skill in the art that the modular formers of the present invention satisfy a signficant need in assuring stablization of core output flow through the inner barrel of a nuclear power generator having a complex and advanced design of the type herein disclosed. Fabrication costs of the module are minimized due to standardization of parts and the capability of automated assembly of each module as a unit, prior to installation in the reactor; further, final assembly welding of each module to the inner barrel sidewall may be accomplished expeditiously. These and other advantages will be apparent to those skilled in the art, as will numerous modifications and adaptations of the particular modular formers of the invention as herein disclosed. Accordingly, it is intended by the appended claims to cover all such modifications and adaptations of the invention as fall within the true spirit and scope of the appended claims.

We claim as our invention:

1. A modular former for use in combination with the inner barrel assembly of a pressurized water reactor having disposed therein an array of plural rod guides, said rod guides respectively housing therewithin corresponding pluralities of rods, the inner barrel assembly having a generally cylindrical sidewall and the peripheral edges of the array being spaced from the interior surface of the inner barrel assembly sidewall and defining at least one peripheral region therebetween, said guides and said rods being disposed in parallel axial relationship with each other and with the axis of the inner barrel assembly, comprising:

a pair of first and second former plates each having an outer edge configured to correspond to said interior surface of said inner barrel assembly sidewall in said at least one peripheral region and an inner edge having a contoured configuration mating the peripheral edge of said array defining said at least one peripheral region;

at least one column associated with said pair of former plates, each said column being of U-shaped cross-sectional configuration and having first and second ends, each of said first and second ends of each said column having a plurality of integral projections;

each of said first and second plates having a plurality of slots therein respectively corresponding to and receiving therethrough the projections of the respective first and second ends of each said column for assembling said first and second plates on the respective first and second ends of each said associated column;

a weld bead formed at the juncture of each said projection, as received through the corresponding said slot, and said respectively corresponding plate for rigidly interconnecting same in parallel, spaced relationship; and attachment means secured to each of said first and second plates and extending beyond said respective outer edges thereof, for insertion through corresponding holes provided therefor in said sidewall of said inner barrel assembly and attachment thereto from the exterior surface of said inner barrel assembly sidewall.

2. A modular former as recited in claim 1, wherein said plurality of integral projections on each said end of each said column and the corresponding plurality of slots are relatively displaced in accordance with the said U-shaped cross-sectional configuration to afford a multipoint connection between each of said ends of said column and teh respective said plates.

3. A modular former as recited in claim 2, wherein each said plurality of integral projections on each said end of each said column comprises three projections relatively dispalced in accordance with said U-shaped cross-sectional configuration of said column.

4. A modular former for use in combination with the inner barrel assembly of a pressurized water reactor having disposed therein an array of plural rod guides, said rod guides respectively housing therewithin corresponding pluralities of rods, the inner barrel assembly having a generally cylindrical sidewall and the peripheral edges of the array being spaced from the interior surface of the inner barrel assembly sidewall and defining at least one peripheral region therebetween, said guides and said rods being disposed in parallel axial relationship with each other and with the axis of the inner barrel assembly, comprising:

a pair of first and second former plates each having an outer edge configured to correspond to said interior surface of said inner barrel assembly sidewall in said at least one peripheral region and an inner edge having a contoured configuration mating the peripheral edge of said array defining said at least one peripheral region;

at least one column associated with said pair of former plates, each said column having first and second ends respectively secured to said first and second plates and extending perpendicularly therebetween for rigidly interconnecting same in parallel, spaced relationship; and first and second attachment means secured to each of said first and second plates, each said attachment means comprising a mounting block secured to the respective said plate and an integral shank extending from the mounting block and beyond the outer edge of the respective said plate, said integral shanks of said attachment means extending in parallel relationship for insertion through corresponding holes provided in said sidewall of said inner barrel assembly and extending therethrough in corresponding, parallel relationship, each said corresponding holes receiving a respectively associated said integral shank, for attachment of each said shank to said sidewall of said inner barrel assembly from the exterior surface of said inner barrel assembly sidewall.

5. A modular former as recited in claim 4, wherein each said mounting block includes a pair of legs extending from a common surface of said mounting block in parallel with each other and with the axis of said integral shank, said legs being disposed on the surface of said associated plate and welded thereto.

6. Modular formers for use in combination with the inner barrel assembly of a pressurized water reactor, adapted for installation in at least one bank of plural said modular formers at a predetermined common elevation within a corresponding plurality of peripheral regions between the inner circumferential surface of the cylindrical sidewall of the inner barrel assembly of a pressurized water reactor and the periphery of an array of plural rod guides, respectively housing therewithin corresponding pluralities of rods, disposed within said cylindrical sidewall in parallel axial relationship with the vertical axis thereof, the periphery of the array comprising a plurality of peripheral edges in a repeating pattern of a succession of at least first and second different edge configurations and said plurality of corresponding peripheral regions comprising a corresponding, repeating pattern of a succession of at least first and second, different area configurations corresponding to said respective first and second different configurations of said peripheral edges of said array, comprising:

a plurality od modular formers of at least first and second different configurations respectively corresponding to said plurality of peripheral regions of said at least first and second different area configurations and disposed at the predetermined, common elevation within the respectively corresponding peripheral regions of said first and second different area configurations, in a respectively corresponding, repeating pattern of a succession of said modular formers of said at least first and second different configurations;

each said modular former comprising a pair of first and second former plates each having an outer edge configured to correspond to an angular segment of the interior circumferential surface of said cylindrical sidewall associated with the corresponding peripheral region and an inner edge extending in chord-like relationship to said outer edge and having a contoured configuration mating the respective, juxtaposed peripheral edge of said array associated with the respective said peripheral region;

at least one column associated with each said pair of former plates, each said column having first and second ends respectively secured to said first and second plates of said pair and extending perpendicularly therebetween for rigidly interconnecting same in parallel, spaced relationship, each said column having a cross-sectional configuration corresponding to at least a portion of the contoured configuration of said inner edges of said pair of associated plates and being secured to said plates with the cross-sectional configuration of said column in aligned relationship with the corresponding portion of the contoured inner edges of said plates; and attachment means secured to each of said first and second plates, said attachment means extending beyond the respective outer edges of said plates and through corresponding holes provided thereof in said sidewall of said inner barrel assembly and being attached thereto from the exterior surface of said inner barrel assembly sidewall.

7. Modular formers as recited in claim 6, wherein, in a given said bank thereof, said vertical columns of said modular formers are of identical height and said first and second plates of said respective, associated pairs thereof are disposed in respectively corresponding first and second horizontal planes transverse to the vertical axis of said inner barrel assembly.

8. Modular formers as recited in claim 7, wherein there are further provided first and second annular recesses within said interior surface of said inner barrel assembly sidewall at respective elevations corresponding to the respective said horizontal planes of said first and second former plates of said modular formers of said given bank, the outer edges of said first and second former plates of said plurality of modular formers of said bank being received in the respective said first and second annular recesses.

9. Modular formers as recited in claim 6, wherein each of said attachment means comprises:

a mounting block and an integral shank extending therefrom and beyond the arcuate segment outer edge of the respective said former plate and received through a corresponding said hole provided therefor in the sidewall of said inner barrel assembly.

10. Modular formers as recited in claim 9, further comprising a weld bead formed from the outer surface of said inner barrel assembly sidewall between the end of each said integral shank and the sidewall surrounding the corresponding said hole through which said shank is received.

11. Modular formers as recited in claim 6, wherein said array periphery comprises a plurality of peripheral edges in a pattern of eight successive, alternating first and second different edges of respectively shorter and greater lengths, defining a corresponding pattern of eight successive, alternating first and second different configurations of said plurality of peripheral regions, and wherein:

said plurality of modular formers in each said bank thereof comprises eight modular formers in an alternating succession of four first modular formers and four second modular formers of corresponding first and second different configurations, respectively corresponding to said eight successive, alternating first and second different configurations of said peripheral regions; and said chordlike inner edges of said pairs of former plates of said respective first and second configurations are correspondingly of relatively greater and relatively shorter lengths.

12. Modular formers as recited in claim 11, wherein said first and second peripheral edges have respective, first and second different contours as defined by the configurations of said plural rod guides as assembled within said array, and wherein:
    said chordlike inner edges of the respective said pairs of former plates of said modular formers of said first and second configurations have respective first and second different contours mating said first and second different contours of said respective first and second different peripheral edges of said array; and
    the respective columns of said modular formers of said first and second different configurations have corresponding first and second, different cross-sectional configurations respectively corresponding to said first and second different mating contours of said chordlike inner edges of the respectively associated pairs of former plates of the respective said first and second modular formers.

13. Modular formers as recited in claim 12, wherein the contour of the first peripheral edges of the array comprises relatively larger radial projections in relatively smaller angular spaced relationship, and the contour of said second peripheral edges of the array comprises relatively smaller radial projections in more greatly spaced angular relationship, and wherein:
    the chordlike inner edges of said pair of former plates of said modular formers of said first configuration have a mating contour of relatively deeper, radially outward and more closely angularly spaced openings, and said chordlike inner edges of said pair of former plates of said modular formers of said second configuration have a mating contour of relatively shallower, radially outward and more greatly angularly spaced openings; and
    the respective columns of said modular formers of said first and second different configurations have cross-sectional configurations respectively corresponding to said mating contours of said chordlike inner edges of the respectively associated said pairs of former plates.

14. Modular formers as recited in claim 12, wherein:
    each of said first and second ends of each said column includes a plurality of integral projections;
    each of said first and second plates of each said pair respectively associated with each said column includes a plurality of slots therein respectively corresponding to and receiving therethrough the corresponding projections of the respective first and second ends of the associated said column; and
    said projections at each of said ends of each said column and said corresponding slots in each of said associated pair of plates are disposed in positions corresponding to the respective said mating contours.

15. A nuclear reactor system, comprising:
    a pressure vessel;
    an inner barrel assembly disposed in said pressure vessel;
    an array of plural rod guides respectively housing therewithin corresponding pluralities of rods, said rod guides being disposed within the inner barrel assembly sidewall with the peripheral edges of the array spaced from the interior surface of the inner barrel assembly sidewall and defining at least one peripheral region therebetween, said guides and said rods being disposed in parallel axial relationship with each other and with the axis of the inner barrel assembly;
    a pair of first and second former plates each having an outer edge configured to correspond to said interior surface of said inner barrel assembly sidewall in said at least one peripheral region and an inner edge having a contoured configuration mating the peripheral edge of said array defining said at least one peripheral region;
    at least one column associated with said pair of former plates, each said column being of U-shaped cross-sectional configuration and having first and second ends, each of said first and second ends of each said column having a plurality of integral projections;
    each of said first and second plates having a plurality of slots therein respectively corresponding to and receiving therethrough the projections of the respective first and second ends of each said column for assembling said first and second plates on the respective first and second ends of each said associated column;
    a weld bead formed at the juncture of each said projection, as received through the corresponding said slot, and said respectively corresponding plate for rigidly interconnecting same in parallel, spaced relationship; and
    attachment means secured to each of said first and second plates and extending beyond said respective outer edges thereof, for insertion through corresponding holes provided therefor in said sidewall of said inner barrel assembly and attachment thereto from the exterior surface of said inner barrel assembly sidewall.

16. A nuclear reactor system as recited in claim 15, wherein said plurality of integral projections on each said end of each said column and the corresponding plurality of slots are relatively displaced in accordance with the said U-shaped cross-sectional configuration to afford a multipoint connection between each of said ends of said column and the respective said plates.

17. A nuclear reactor system as recited in claim 16, wherein each said plurality of integral projections on each said end of each said column comprises three projections relatively displaced in accordance with said U-shaped cross-sectional configuration of said column.

18. A nuclear reactor system, comprising:
    a pressure vessel;
    an inner barrel assembly disposed in said pressure vessel;
    an array of plural rod guides respectively housing therewithin corresponding pluralities of rods, said rod guides being disposed within the inner barrel assembly sidewall with the peripheral edges of the array spaced from the interior surface of the inner barrel assembly sidewall and defining at least one peripheral region therebetween, said guides and said rods being disposed in parallel axial relationship with each other and with the axis of the inner barrel assembly;
    a pair of first and second former plates each having an outer edge configured to correspond to said interior surface of said inner barrel assembly sidewall in said at least one peripheral region and an inner edge having a contoured configuration mating the peripheral edge of said array defining said at least one peripheral region;

at least one column associated with said pair of former plates, each said column having first and second ends respectively secured to said first and second plates and extending perpendicularly therebetween for rigidly interconnecting same in parallel, spaced relationship; and first and second attachment means secured to each of said first and second plates, each said attachment means comprising a mounting block secured to the respective said plate and an integral shank extending from the mounting block and beyond the outer edge of the respective said plate, said integral shanks of said attachment means extending in parallel relationship for insertion through corresponding holes provided in said sidewall of said inner barrel assembly and extending therethrough in corresponding parallel relationship, each said corresponding hole receiving a respectively associated said integral shank, for attachment of each said shank to said sidewall of said inner barrel assembly from the exterior surface of said inner barrel assembly sidewall.

19. A nuclear reactor system as recited in claim 18, wherein each said mounting block includes a pair of legs extending from a common surface of said mounting block in parallel with each other and with the axis of said integral shank, said legs being disposed on the surface of said associated plate and welded thereto.

20. Modular formers adapted for assembly in a bank of plural said formers disposed at a common elevation and at respective, angularly displaced, fixed positions about a vertical axis and said bank having an outer periphery defining a generally cylindrical boundary of a predetermined radius about the vertical axis, each said modular former comprising:

a pair of first and seocnd former plates, each said plate having an outer edge configured to correspnd to an angular segment of the cylindrical boundary and an inner edge extending in cord-like relationship relative to said outer edge and defining therewith an interior peripheral region of a predetermined configuration, relative to the cylindrical boundary;

at least one column associated with said pair of former plates, each said column having first and second ends respectively secured to said first and second plates and extending perpendicularly therebetween and rigidly interconnecting said first and second former plates in parallel, spaced relationship; and at least first and second, related cantilever attachment means secured to each said plate, each said cantilever attachment means comprising a mounting block and an axially aligned, integral shank, respective said mounting blocks of said related attachment means being secured to said respective plate with said integral shanks thereof extending beyond said outer edge of said respective plate by a predetermined distance and in mutually parallel axial relationship with respect to a radius extending from the vertical axis and centrally of the angular segment defined by said outer edge of said respective plate, said integral shanks associated with each said modular former thereby extending in mutually parallel relationship and being adapted for being inserted, substantially simultaneously, into correspondingly disposed and aligned, parallel axial receiving holes in a cylindrical wall of predetermined thickness disposed about the cylindrical boundary by translational movement of said modular former in a path parallel to the aligned axes of said integral shanks and the respective receiving holes.

21. Modular formers, as recited in claim 20, wherein:
each said column is of U-shaped cross-sectional configuration;
each of said first and second ends of each said column includes a plurality of integral projections;
each of said first and second plates of each said modular former includes a plurality of slots therein respectively corresponding to, and receiving therethrough, said projections of the respective said first and second ends of said column for assembling said first and seocnd plates on the respective first and second ends of each said associated column of a given said modular formers; and
a weld bead is formed at the juncture of each said projection, as recieved through the corresponding said slot, and said respectively corresponding plate.

22. Modular formers as recited in claim 21, wherein said plurality of integral projectiosn on each said end of each said column and the corresponding plurality of slots in each said plate are relatively displaced in accordance with the said U-shaped cross-sectional configuration of each said column to afford a multipoint connection between each of said ends of each said column and the respective said plates of each said modular former.

23. Modular formers, as recited in claim 20, further comprising at least first and second pluralities of modular formers having respective, said pairs of said first and second former plates of respective, at least first and second different predetermined configurations and adapted for assembly in a bank in a repeating pattern of a succession of said modular formers of said at least first and second different configuration.

24. Modular formers as recited in claim 23, wherein said modular formers are adapted for assembly in a plurality of vertically-spaced banks.

25. A method of assembly and installation of formers in the inner barrel assembly of a pressurized water reactor, said inner barrel assembly defining a generally cylindrical interior surface of a predetermined radius and predetermined axial height and being designed to accommodate therein an array of plural rod guides in vertically extending, parallel axial relationship, the periphery of said array comprising a plurality of peripheral edges defining a corresponding plurality of interior regions of corresponding, predetermined area configurations between the peripheral edges of the array and the corresponding angular segments of said generally cylindrical interior surface of said inner barrel assembly, comprising:

forming a plurality of modular formers, respectively corresponding to said plurality of interior regions and said respective, predetermined area configurations, within a given, said inner barrel assembly, comprising providing a pair of first and second former plates for each said modular former, each said plate having an outer edge configured to correspond to the angular segment of the interior cylindrical surface of the inner barrel assembly and an inner edge extending in core-like relationship relative to said outer edge and corresponding to the associated peripheral edge of said array and defining, with said outer edge, a configuration of said plate corresponding to said predetermined area configuration of the respective, interior region, assembling at least one column with said pair of first and second former plates so as to extend perpendicularly therebetween and contact same at its respectively, opposite ends, rigidly and permanently securing each said column at its opposite ends to the respective, said first and second former plates, and securing at least first and second, related cantilever attachment means to each said plate, each said cantilever attachment means comprising a mounting block and an axially aligned integral shank, by permanently securing said mounting block to said plate with said shank thereof extending beyond said outer edge of the respective said plate in parallel relationship to a radius extending centrally of the angular segment defined by the said respective plate;

defining a plurality of mounting positions within the interior of a given inner barrel assembly, at a desired axial height and at angularly spaced relationships corresponding to said plurality of interior regions, for said plurality of respectively corresponding modular formers;

at each said mounting position, forming parallel axial holes through said cylindrical sidewall of said inner barrel assembly at predetermined positions corresponding to and in axial alignment with the corresponding shanks of the attachment means of the respective said modular former;

mounting each said modular former to said cylindrical sidewall of said inner barrel assembly at the respective mounting position, by aligning said respective shanks thereof with, and inserting same into, the corresponding said holes in said cylindrical sidewalls of said inner barrel assembly; and welding said shanks to said cylindrical sidewall from the exterior of said cylindrical sidewall of said inner barrel assembly.

* * * * *